United States Patent
Matsuoka

(10) Patent No.: US 8,120,702 B2
(45) Date of Patent: Feb. 21, 2012

(54) DETECTION DEVICE AND DETECTION METHOD FOR 32-PULL DOWN SEQUENCE

(75) Inventor: Hideki Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1283 days.

(21) Appl. No.: 11/787,649

(22) Filed: Apr. 17, 2007

(65) Prior Publication Data

US 2007/0252915 A1     Nov. 1, 2007

(30) Foreign Application Priority Data

Apr. 27, 2006   (JP) .................................. 2006-123756

(51) Int. Cl.
*H04N 5/50* (2006.01)

(52) U.S. Cl. ....................................................... 348/441

(58) Field of Classification Search .................. 348/441, 348/448, 452, 449, 459, 558, 700, 451
See application file for complete search history.

(56) References Cited

U.S. PATENT DOCUMENTS

| | | | | |
|---|---|---|---|---|
| 5,757,435 A * | 5/1998 | Wells | ............................. | 348/441 |
| 5,835,163 A * | 11/1998 | Liou et al. | ...................... | 348/700 |
| 5,844,618 A * | 12/1998 | Horiike et al. | ................. | 348/441 |
| 6,167,088 A * | 12/2000 | Sethuraman | ................ | 375/240.1 |
| 6,297,848 B1 * | 10/2001 | Westerman | .................... | 348/448 |
| 6,408,024 B1 * | 6/2002 | Nagao et al. | .............. | 375/240.01 |
| 6,670,996 B2 * | 12/2003 | Jiang | .............................. | 348/558 |
| 6,965,414 B2 | 11/2005 | Haraguchi | | |
| 6,973,129 B2 * | 12/2005 | Komaki | .................... | 375/240.15 |
| 7,113,221 B2 * | 9/2006 | Law et al. | ...................... | 348/448 |
| 7,349,029 B1 * | 3/2008 | Chou | ............................. | 348/448 |
| 7,468,756 B2 * | 12/2008 | Wyman | ......................... | 348/558 |
| 7,595,843 B2 * | 9/2009 | Neuman et al. | ............... | 348/700 |
| 2003/0115590 A1 | 6/2003 | Haraguchi | | |

FOREIGN PATENT DOCUMENTS

| | | |
|---|---|---|
| JP | 10-65964 | 3/1998 |
| JP | 2002-354431 | 12/2002 |
| JP | 2003-78926 | 3/2003 |

* cited by examiner

*Primary Examiner* — Paulos Natnael
(74) *Attorney, Agent, or Firm* — Katten Muchin Rosenman LLP

(57) ABSTRACT

60 fields of an interlace image (telecine image) after 32-pull down is input. The input images stored in field memories are read, and the grayscale difference (difference absolute value) between frames is computed by a pixel difference absolute value subtractor. The difference absolute value and five threshold values are compared by an absolute value difference comparator. A cumulative adder stores one field of comparison result. A flag information creation processing unit creates a flag information table for indicating whether a current field is a repeat field with noise or not, based on the information from the cumulative adder. A repeat field judgment unit detects a 32-pull down sequence from the flag information table, and detects whether the current field is a repeat field with noise or not, and so forth. A 32-transform control unit performs IP (Interlace to Progressive) conversion based on the detected repeat fields.

7 Claims, 12 Drawing Sheets

BLOCK DIAGRAM OF DETECTION DEVICE 1

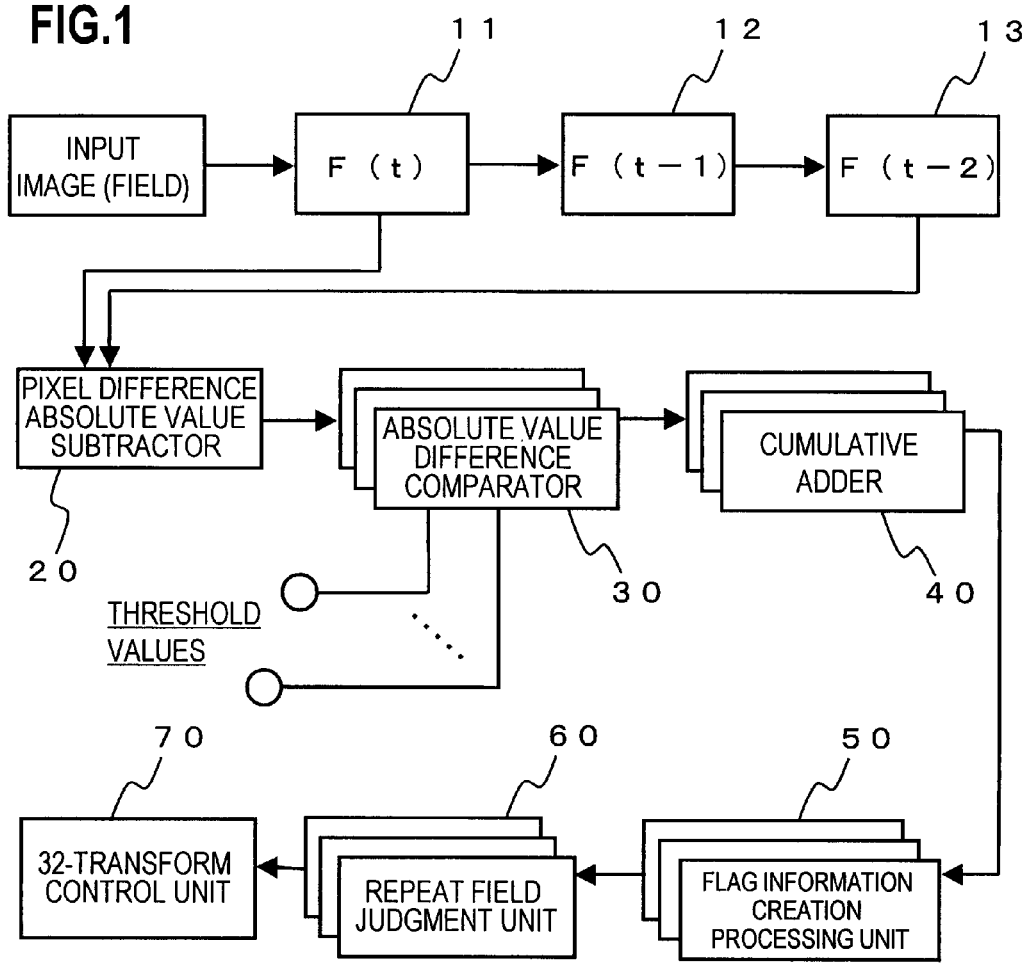

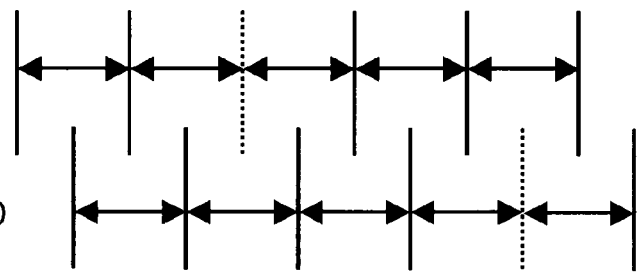
EXTRACTION OF INTER-FRAME DIFFERENCE

| [Field] [0] REPEAT FIELD WITHOUT NOISE | [Field] [1] OTHER FIELD WITHOUT NOISE | [Field] [2] REPEAT FIELD WITH NOISE | [Field] [3] OTHER FIELD WITH NOISE |
|---|---|---|---|
| 0 | 1 | 0 | 0 |
| 0 | 1 | 0 | 0 |
| ⋮ | ⋮ | ⋮ | ⋮ |

FIG.3A   EXAMPLE OF FLAG INFORMATION TABLE (Flg_tb1 [Field] [Stat])

| [Field] [0] REPEAT FIELD WITHOUT NOISE | [Field] [1] OTHER FIELD WITHOUT NOISE | [Field] [2] REPEAT FIELD WITH NOISE | [Field] [3] OTHER FIELD WITH NOISE |
|---|---|---|---|
| 0 | 1 | 0 | 0 |
| 1 | 0 | 0 | 0 |
| 0 | 1 | 0 | 0 |

FIG.3B   EXAMPLE OF FLAG INFORMATION TABLE IN THE CASE OF NO NOISE STATE

| [Field] [0] REPEAT FIELD WITHOUT NOISE | [Field] [1] OTHER FIELD WITHOUT NOISE | [Field] [2] REPEAT FIELD WITH NOISE | [Field] [3] OTHER FIELD WITH NOISE |
|---|---|---|---|
| 0 | 0 | 0 | 1 |
| 0 | 0 | 1 | 0 |
| 0 | 0 | 0 | 1 |

FIG.3C   EXAMPLE OF FLAG INFORMATION TABLE IN THE CASE OF NOISE STATE

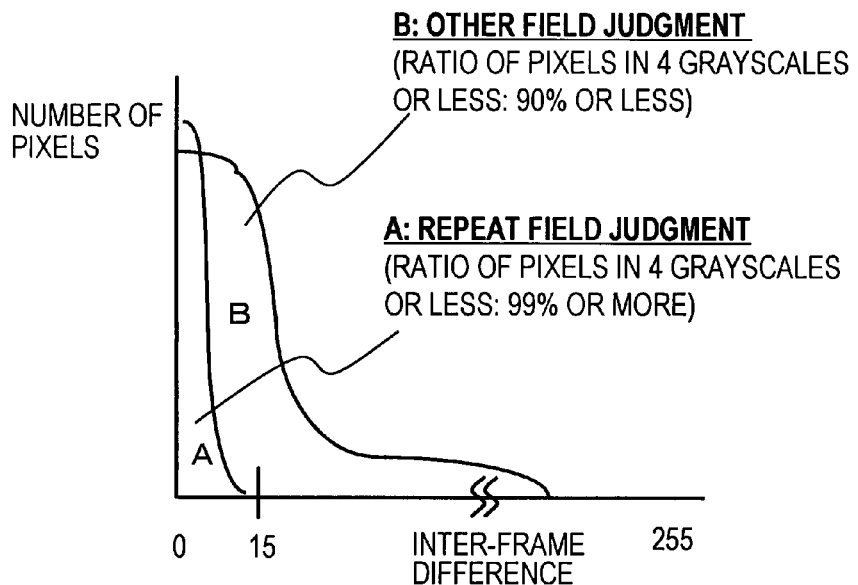
FIG.4A INTER-FRAME DIFFERENCE DISTRIBUTION WITHOUT NOISE
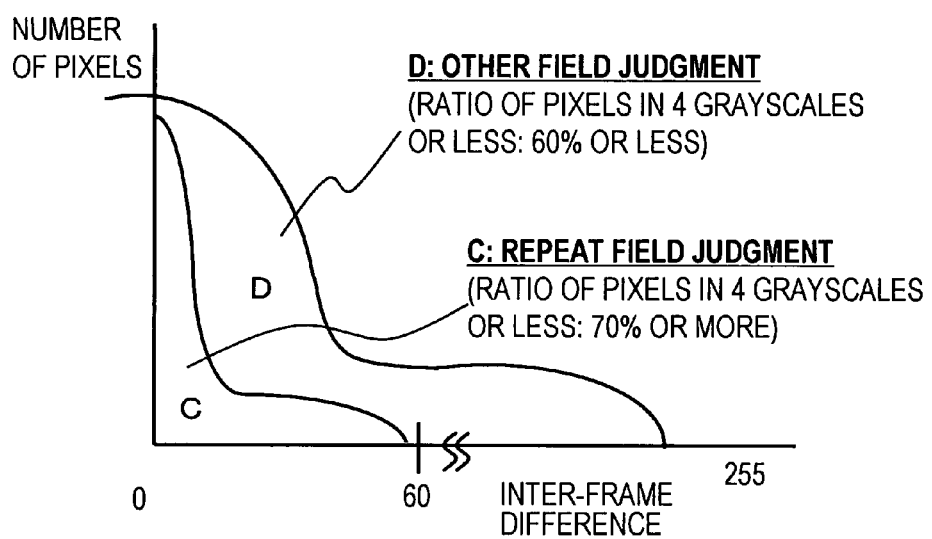
FIG.4B INTER-FRAME DIFFERENCE DISTRIBUTION WITH NOISE

FIG.5

| [Field] [0] REPEAT FIELD WITHOUT NOISE | [Field] [1] OTHER FIELD WITHOUT NOISE | [Field] [2] REPEAT FIELD WITH NOISE | [Field] [3] OTHER FIELD WITH NOISE |
|---|---|---|---|
| 1 | 0 | 0 | 0 |
| 0 | 1 | 0 | 0 |
| 0 | 1 | 0 | 0 |
| 0 | 1 | 0 | 0 |
| 0 | 1 | 0 | 0 |
| 1 | 0 | 0 | 0 |
| 0 | 1 | 0 | 0 |
| 0 | 1 | 0 | 0 |
| 0 | 1 | 0 | 0 |
| 0 | 1 | 0 | 0 |
| 1 | 0 | 0 | 0 |

EXAMPLE OF FLAG INFORMATION TABLE
(REPEAT FIELD DETECTION WITHOUT NOISE)

FIG.6

| [Field] [0] REPEAT FIELD WITHOUT NOISE | [Field] [1] OTHER FIELD WITHOUT NOISE | [Field] [2] REPEAT FIELD WITH NOISE | [Field] [3] OTHER FIELD WITH NOISE |
|---|---|---|---|
| 0 | 0 | 1 | 0 |
| 0 | 0 | 0 | 1 |
| 0 | 0 | 0 | 1 |
| 0 | 0 | 0 | 1 |
| 0 | 0 | 0 | 1 |
| 0 | 0 | 1 | 0 |
| 0 | 0 | 0 | 1 |
| 0 | 0 | 0 | 1 |
| 0 | 0 | 0 | 1 |
| 0 | 0 | 0 | 1 |
| 0 | 0 | 1 | 0 |

**EXAMPLE OF FLAG INFORMATION TABLE
(REPEAT FIELD DETECTION WITH NOISE)**

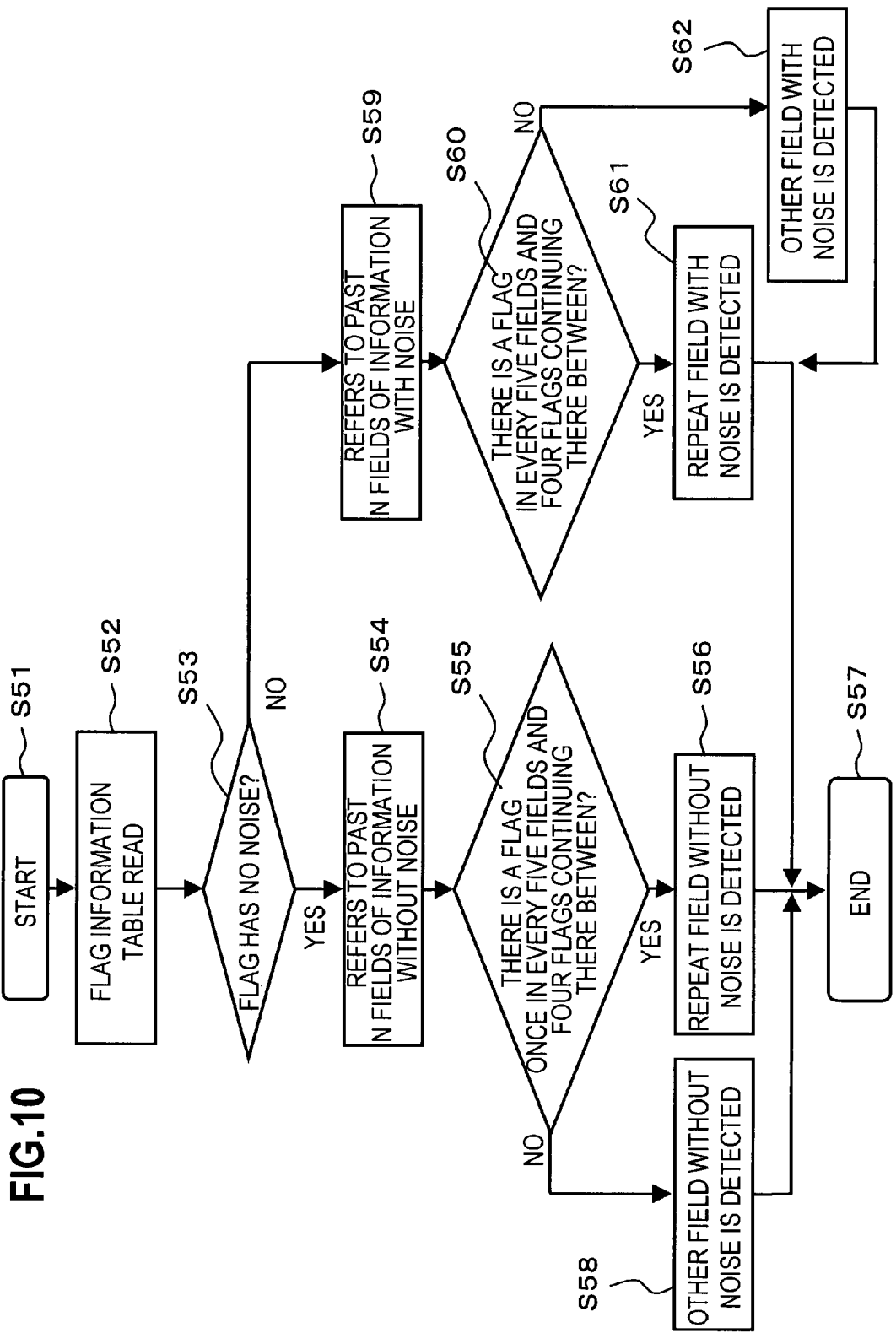

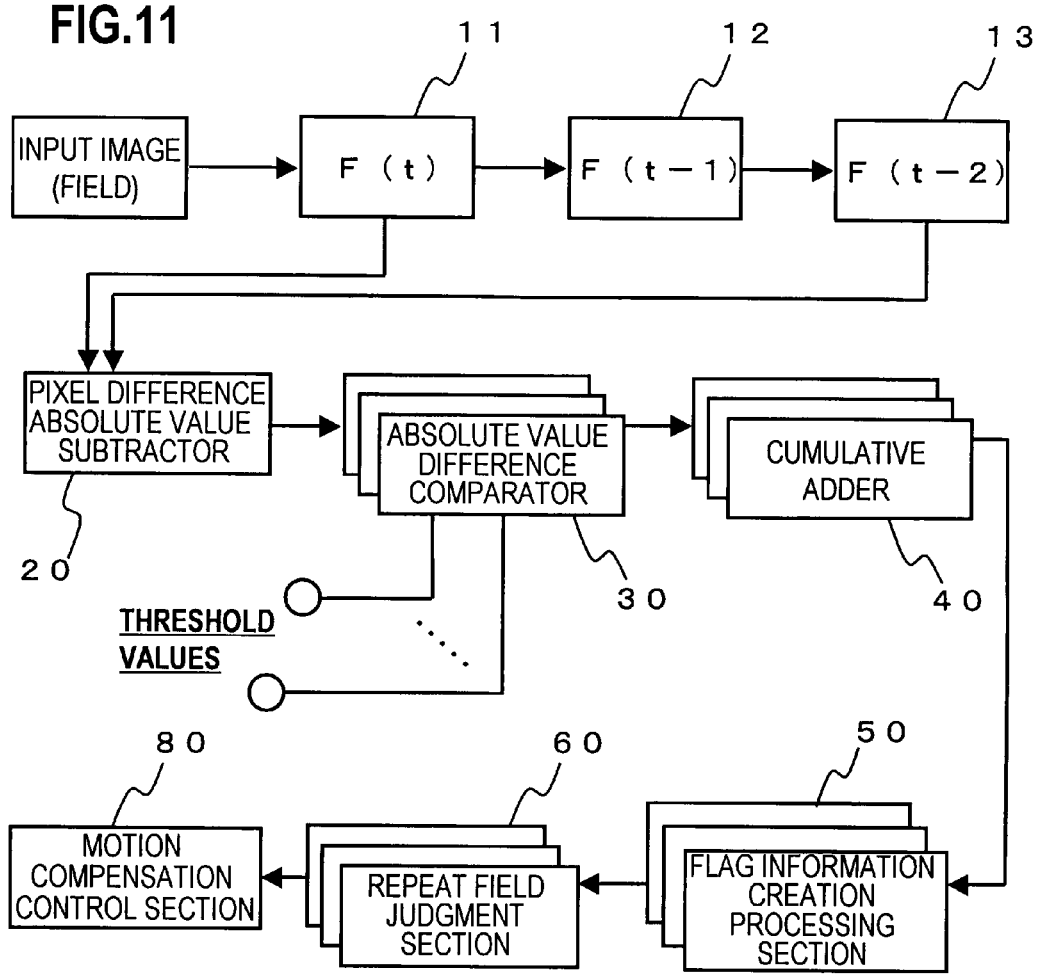
GENERAL BLOCK DIAGRAM OF ANOTHER DETECTION DEVICE 1

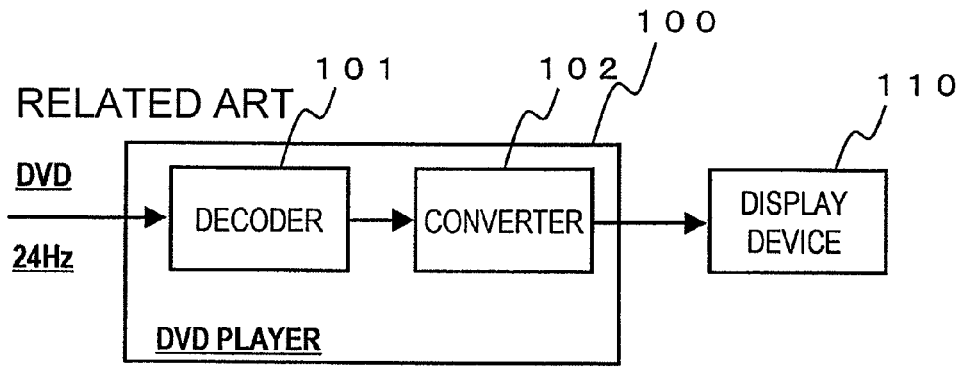
FIG. 12A  EXAMPLE WHEN 24 HZ SIGNAL IS CONVERTED INTO 60 HZ BY DVD PLAYER, AND IS DISPLAYED AS DVD REGENERATION
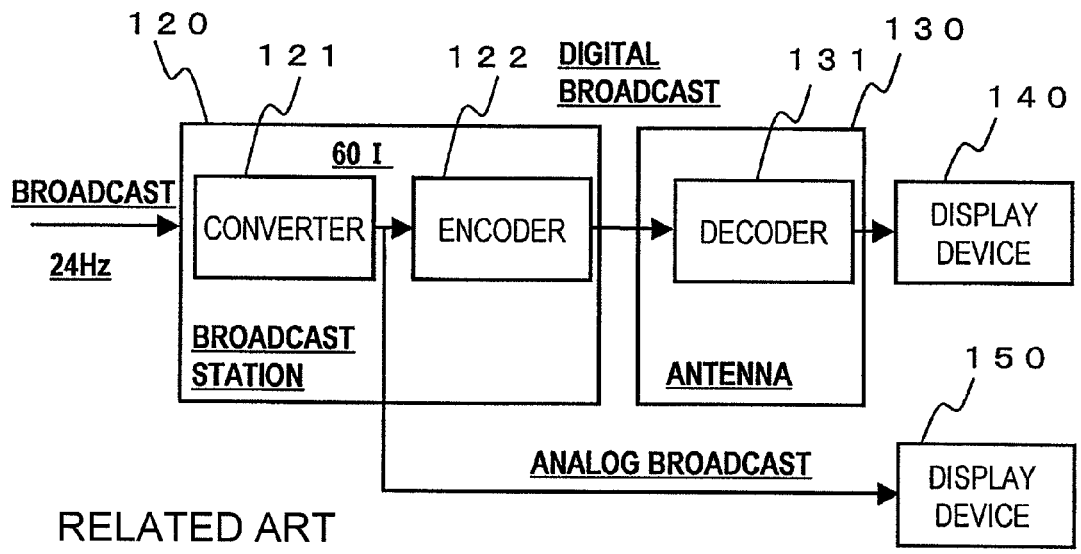
RELATED ART
FIG. 12B  EXAMPLE WHEN NTSC SIGNAL IS DECODED AND DISPLAYED

DETECTION DEVICE AND DETECTION METHOD FOR 32-PULL DOWN SEQUENCE

CROSS-REFERENCE TO RELATED APPLICATIONS

This application is based upon and claims the benefit of priority from the prior Japanese Patent Application No. 2006-123756, filed on Apr. 27, 2006, the entire contents of which are incorporated herein by reference.

BACKGROUND OF THE INVENTION

1. Field of the Invention

The present invention relates to a detection device and detection method for detecting a repeat field in a telecine image transformed into 60 fields by 32-pull down, and more particularly to a detection device or the like for detecting a 32-pull down sequence at high reliability.

2. Description of the Related Art

When an image (cinema image) based on a 24 frame progressive scan is transformed into an image (telecine image) based on a 60 field interlace scan, a transformed processing called a 32-pull down has been conventionally used.

The 32-pull down transforms the cinema image into the telecine image by repeating a field two fields before once every five fields (e.g. Japanese Patent Application Laid-Open No. 2002-354431).

By this, the cinema image recorded on a DVD (Digital Versatile Disk) can be transferred to a display device as NTSC type TV signals, and the cinema image can be transmitted from a broadcast station as NTSC type TV signals.

In the case of displaying the 60 field telecine image transferred from the DVD, or transmitted from the broadcast station on the 60 frame progressive type display device, the 32-pull down sequence is detected (particularly the field repeated by 32-pull down sequence (hereafter called "repeat field") is detected), and the interlace image is transformed into the progressive image (IP (Interlace to Progressive) transform).

In the IP transform, the 60 fields telecine image is transformed into the original 24 frame progressive image, by deleting the detected repeat fields, for example. And the telecine image is transformed into the progressive image by repeating two frames and repeating three frames for every other frame.

FIG. 12A and FIG. 12B are diagrams depicting a system configuration example when IP transform is performed, and the telecine image is displayed on the display device as the 60 frame progressive image.

FIG. 12A is a diagram depicting a system configuration example when the telecine image regenerated from a DVD is IP-transformed by a DVD player 100, and is displayed on a display device 110.

The DVD player 100 has a decoder 101 for decoding the telecine image encoded by compression, for example, and a converter 102 for IP-transforming the decoded telecine image. The repeat field is detected in the converter 102.

FIG. 12B is a diagram depicting a system configuration example when the telecine image transmitted from the broadcast station 120 is IP-transformed and displayed on display devices 140 and 150.

The broadcast station 120 has a converter 121 for performing 32-pull down transform, and an encoder 122 for encoding, such as compression.

By the converter 121, the cinema image is transformed into the telecine image, and is output to a display device 150 in a home as an analog broadcast. The telecine image is encoded by compressing, for example, by the encoder 122, and is output to the display device 140 via an antenna 130 as a digital broadcast.

IP transform is performed by the decoder 131 on the display device 140 in the case of the digital broadcast, and is performed by the display device 150 in the case of the analog broadcast.

In IP transform, it is critical to detect repeat fields. Conventionally the difference value of each pixel between adjacent fields is determined for the telecine image which is input, and this difference value is compared with a redundant threshold and a non-redundant threshold (e.g. Japanese Patent Application Laid-Open No. 2002-354431).

In another prior art, the repeat field is detected by comparing a cumulatively added difference value with a threshold value for each field period (e.g. Japanese Patent Application Laid-Open No. H10-65964).

However in the case of detecting repeat fields according to Japanese Patent Application Laid-Open No. 2002-354431 and No. H10-65964, if the telecine image broadcasted from the broadcast station is IP-transformed, for example, the progressive image cannot be displayed at high image quality because of the influence of noise.

In the example in FIG. 12B, noise is generated in the received telecine image because of the influence of air in the case of the analog broadcast. In the case of the digital broadcast, the telecine image before encoding cannot be perfectly regenerated by decoding because of the encoded noise. This problem in particular is conspicuous if encoding is a lossy transform.

Also the characteristics of noise greatly differs between the case of performing IP transform by the DVD player (see FIG. 12A), and the case of performing IP transform of an NTSC signal from the broadcast station (see FIG. 12B), and repeat fields cannot be detected.

SUMMARY OF THE INVENTION

With the foregoing in view, it is an object of the present invention to provide a detection device and detection method for a 32-pull down sequence which can detect repeat fields, at high precision, from an interlace type telecine image transformed by 32-pull down.

To achieve the above object, the present invention is a detection device having a difference distribution information generation unit which generates difference distribution information between frames for an interlace image which is input, and an information table creation unit which creates n types (n is an integer) of information tables from the difference distribution information and n types of judgment conditions, wherein a 32-pull down sequence is detected from m fields (m is 5 or higher integer) of information in the past in the information table.

The detection device of the present invention further has a cumulative counter which accumulates one field of the generated difference distribution information, wherein the information table creation unit creates the information tables from the judgment conditions and one field of the difference distribution information accumulated by the cumulative counter.

The detection device of the present invention further has a judgment unit which judges a current field as a repeat field based on the information tables when information to indicate the repeat field is stored in the information tables for the current field and a field which is five fields before, and information to indicate an another field other than the repeat field is stored in the information tables for fields therebetween.

In the detection device of the present invention, the information table creation unit judges whether each of the fields has a noise or not, based only on the difference distribution information.

In the detection device of the present invention, the judgment unit judges that a current field is a still image when the information to indicate the repeat field is continuously stored in the information tables.

The detection device of the present invention further has a motion compensation control unit which control motion compensation for the input interlace image when the current field is judged as the still image by the judgment unit.

In the detection device of the present invention, the n is "5", and the information table creation unit creates the information tables by comparing the difference distribution information with five types of threshold values.

In the detection device of the present invention, information of a current field and the past 10 fields, a total of 11 fields, is stored in the information tables.

To achieve the above object, the present information is a detection method having the steps of: generating difference distribution information between frames for an interlace image which is input; creating n types (n is an integer) information tables from the difference distribution information and n types of judgment conditions; and detecting a 32-pull down sequence from m fields (m is 5 or higher integer) of information in the past in the information tables.

According to the present invention, a detection device and detection method for a 32-pull down sequence can detect repeat fields, at high precision, from an interlace type telecine image transformed by 32-pull down.

BRIEF DESCRIPTION OF THE DRAWINGS

FIG. 1 is a diagram depicting a configuration example of a detection device;

FIG. 2A and FIG. 2B are diagrams depicting the principle of extracting an inter-frame difference;

FIG. 3A to FIG. 3C are examples of a flag information table;

FIG. 4A and FIG. 4B are diagrams depicting the distribution of inter-frame differences;

FIG. 5 is an example of a flag information table;

FIG. 6 is an example of a flag information table;

FIG. 10 is a flow chart depicting an example of the operation of repeat field detection processing;

FIG. 11 is a diagram depicting a configuration example of another detection device; and FIG. 12A is a diagram depicting a configuration example when a 24 Hz signal is converted into 60 Hz by a DVD player and displayed as DVD regeneration, and FIG. 12B is a diagram depicting a configuration example when an NTSC signal is decoded and displayed.

DESCRIPTION OF THE PREFERRED EMBODIMENTS

Figure 7:
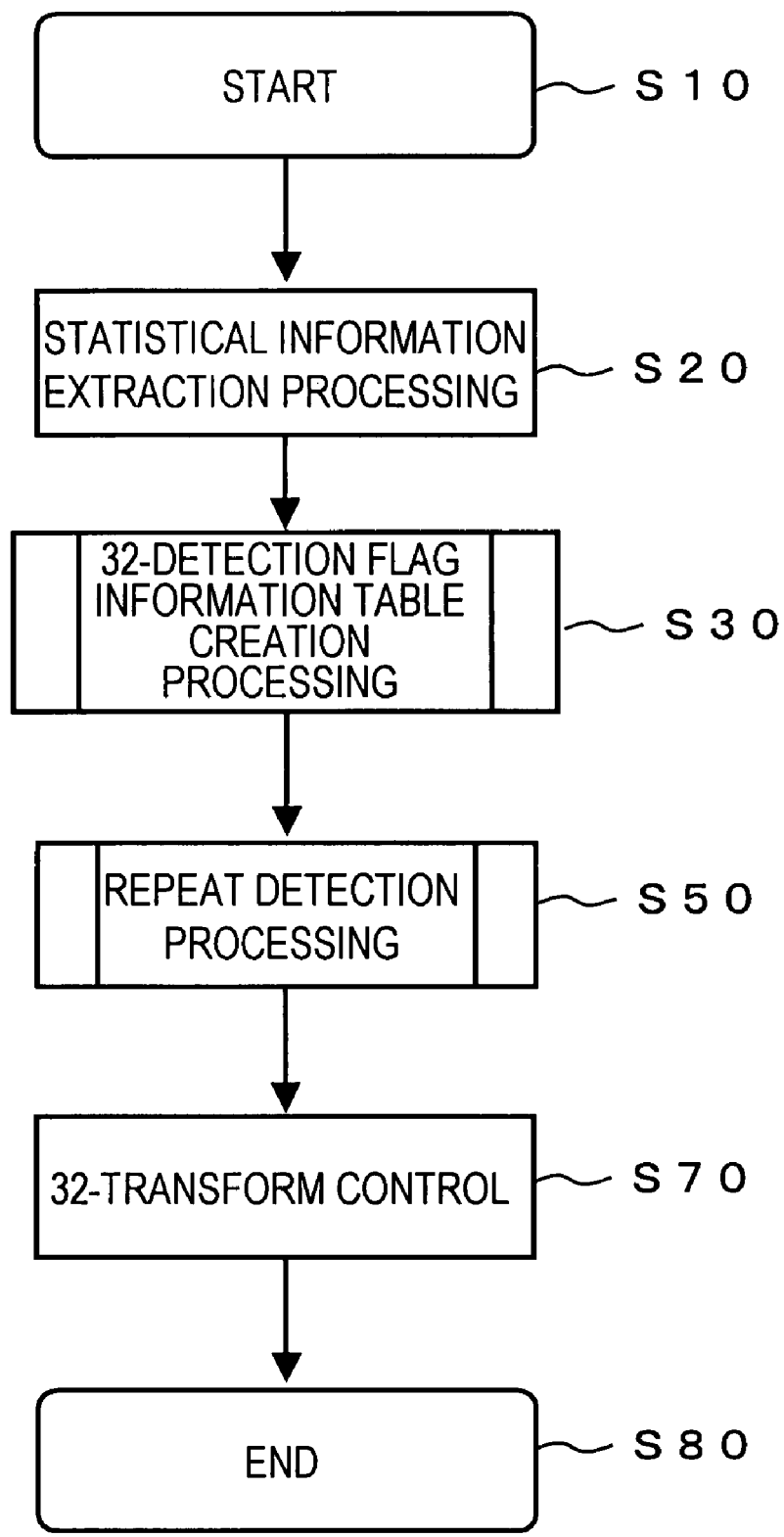
FIG. 7 is a flow chart depicting an example of the operation of general processing.

Embodiments of the present invention will now be described with reference to the drawings.

FIG. 1 is a diagram depicting a configuration example of a detection device 1 for a 32-pull down sequence to which the present invention is applied. As FIG. 1 shows, the detection device 1 has three field memories 11 to 13, a pixel difference absolute value subtractor 20, an absolute value difference comparator 30, a cumulative adder 40, a flag information creation processing unit 50, a repeat field judgment unit 60, and a 32-transform control unit 70.

The three field memories 11 to 13 store three fields of input images (F (t), F (t−1), F (t−2): t is time) which are continuous in time respectively. The input image is 60 fields of an interlace image (telecine image including repeat fields) after 32-pull down.

The pixel difference absolute value subtractor 20 reads a current fields image (F (t)) and field image two fields before (F (t−2)) from the field memories 11 and 13, subtracts the grayscale value at a same pixel position, and extracts the difference absolute value (frame difference).

The extraction of the difference absolute value is because of detecting the distribution of the frame difference between odd fields (top fields) or between even fields (bottom fields) of each pixel in field units. Frame difference distribution information is generated by the pixel difference absolute value subtractor 20.

If a pixel position is expressed by (x, y), the pixel difference absolute value subtractor 20 computes the following formula.

$$\text{Difference absolute value}(\textit{diff})=abs(F(t,x,y)-F(t-2,x,y)) \quad (1)$$

The absolute value difference comparator 30 compares the extracted difference absolute value and five threshold values, and outputs the comparison result.

The first threshold value (S11_TH) is a threshold value for checking whether the difference absolute value exists within four grayscales. This is the threshold value to be used for judging whether the input image includes noise, and for judging the repeat field. The value of the first threshold value (S11_TH) is "5", for example.

The second threshold value (S12_TH) is a threshold value for checking whether the difference absolute value does not exist in 16 grayscales or later. This is the threshold value to be used for judging whether it is the repeat field when the input image does not have noise. The value of the second threshold value (S12_TH) is "15", for example.

The third threshold value (S21_TH) is a threshold value for checking whether the difference absolute value does not exist after 32 grayscales or later. This is the threshold value to be used for judging whether it is another field other than the repeat field when the input image does not have noise. The value of the third threshold value (S21_TH) is "31", for example.

The fourth threshold value (S22_TH) is a threshold value for checking whether the difference absolute value does not exist in 60 grayscales or later. This is the threshold value to be used for judging whether it is the repeat field when the input image has noise. The value of the fourth threshold value (S22_TH) is "59", for example.

The fifth threshold value (S31_TH) is a threshold value for checking whether the difference absolute value does not exist in 80 grayscales or later. This is the threshold value to be used for judging whether it is another field other than the repeat field when the input image has noise.

The value of the fifth threshold value (S31_TH) is "79", for example.

The absolute value difference comparator 30 compares these five threshold values and the difference absolute value respectively. In other words, if the difference absolute value is y−diff, then it is checked whether a pixel that satisfies $$S11\_TH > y\_diff \quad (2)$$

exists for the first threshold value (S11_TH) by comparison. For the second threshold value (S12_TH) to the fifth threshold value (31_TH), it is checked whether a pixel which satisfies $$S12\_TH < y\_diff \quad (3)$$

$$S21\_TH < y\_diff \quad (4)$$

$$S22\_TH < y\_diff \quad (5)$$

$$S31\_TH < y\_diff \quad (6)$$

exists by comparison respectively.

The absolute value difference comparator 30 outputs "1" respectively if pixels satisfy Formulas (2) to (6). In the present embodiment, the absolute value difference comparator 30 is comprised of a total of five absolute value difference comparators 30 so as to compare each threshold value and the difference absolute value by Formulas (2) to (6).

The cumulative adder 40 cumulatively adds the output result of the absolute value difference comparator 30 for one field. In other words, the cumulative adder 40 counts the number of pixels that satisfy Formulas (2) to (6) for the pixels in one field, and outputs the count values (S11COUNT, S12COUNT, S21COUNT, S22COUNT, and S31COUNT respectively).

In the present embodiment, the cumulative adder 40 is comprised of five cumulative adders 40 corresponding to the absolute value difference comparators 30 in the previous stage.

The flag information creation processing unit 50 creates a flag information table indicating whether each field of the input image (more specifically, the current field F(t)) is the repeat field without noise or another field without noise or the repeat field with noise, or another field with noise based on each count value (e.g. S11COUNT).

FIG. 3A shows an example of the flag information table. The flag information table is comprised of an item [Field] [0] indicating whether the field is the repeat field without noise or not, item [Field] [1] indicating whether the field is another field without noise or not, item [Field] [2] indicating whether the field is the repeat field with noise or not, and item [Field] [3] indicating whether the field is another field with noise or not.

If the field of the input image is judged as the repeat field without noise, the flag information creation processing unit 50 sets (or writes) [1] to the item [Field] [0] of the flag information table, and sets "0" to the other items. In the same way, "1" is set in each applicable item. These are judged for each field.

Specifically, this judgment is performed as follows. First a difference value ratio (Sum) is calculated from the count value within the four grayscale difference (S11COUNT). For the calculation formula, $$\text{Difference value ratio(Sum)} = (S11\text{COUNT}/(\text{total number of pixels in one field}))*100 \quad (7)$$

is used. This difference value ratio Sum indicates the ratio of pixels within "4" grayscales in each frame.

And the field is judged as the repeat field without noise when the difference value ratio (Sum) based on Formula (7) is "99%" or more, and the counter value (S12COUNT) is "0" (the difference absolute value does not exist in 16 grayscales or later, that is, the frame difference does not exist in 16 grayscales or later), and "1" is set for the [Field] [0] (which indicates the repeat field without noise) of the flag information table.

In this way, by the combination of the difference value ratio Sum (frame difference ratio) and the count value (e.g. S11COUNT), it is judged whether each field of the input image is the repeat field without noise, or the repeat field with noise, and so on. The reason for this is as follows.

FIG. 4A and FIG. 4B show statistical distribution diagrams of the number of pixels for one field with respect to the frame difference (difference absolute value). In both cases of FIG. 4A and FIG. 4B, a horizontal axis indicates the frame difference value, and a vertical axis indicates the number of pixels.

FIG. 4A is a distribution diagram of the frame difference without noise. As FIG. 4A shows, in the case of the repeat field without noise, each pixel exists in area "A".

In other words, in the case of such the field, almost all the pixels exist within the frame difference "15". And the ratio of the pixels of which frame difference is within "4" grayscales is "99%" or more in the statistics, as shown in FIG. 4A.

This means that if the ratio of pixels of which frame difference is within "4" grayscales (difference value ratio Sum) is "99%" or more and if there are no pixels of which frame difference value is "16" grayscales or more, then it can be judged that the current field F(t) does not have noise, and is the repeat field.

In other words, when the difference absolute value Sum in Formula (7) is "99%" or more, and the count value S12COUNT that satisfies Formula (3) is "0", then it can be judged that this field does not have noise, and is the repeat field.

The above mentioned second threshold (S11_TH) is set to "15", so as to correspond to the frame difference value "15" shown in FIG. 4A.

In the same way, in area "B" of FIG. 4A, each pixel in the another field other than the repeat field which does not have noise exists. In the case of such the field, the ratio of pixels of which the frame difference is within "4" grayscales is "90%" or less statistically (actually between "80%" to "90%").

Therefore if the ratio of the pixels of which frame reference is within "4" grayscales (difference value ratio Sum) is "90%" or less, or if pixels exist in an area of which the frame difference value is "16" grayscales or later, then it can be judged that the current field F(t) is the field without noise, and is the another field.

In the present embodiment, to judge whether the current field F(t) is the another field without noise with certainty, it is judged whether pixels do not exist in an area where the frame difference value is "32" grayscales or later.

In other words, if the difference value ratio (Sum) of Formula (7) is "90%" or less, or if the count value S21COUNT that satisfies Formula (4) is not "0", then it can be judged that the current field F(t) is the field without noise, and is the another field other than the repeat field. The third threshold value (S21_TH) is set to "31" for this reason.

FIG. 4B, on the other hand, shows a distribution diagram of the frame difference with noise. In area "C", each pixel, in the case when the current field F(t) is the field with noise and is the repeat field, exists. In the case of such the field, the ratio of the pixels of which the frame difference is within "4" grayscales is "70%" or more statistically, and the frame difference does not exist in "60" grayscales or later.

Therefore, it can be judged that the current field F(t) is the field with noise, and is the repeat field when the difference value ratio (Sum) of Formula (7) is "70%" or more, and the count value S22COUNT that satisfies Formula (5) is "0". The fourth threshold (S22_TH) is set to "59" for this reason.

In area "D", each pixel of the current field F(t), which is the field with noise and is the another field other than the repeat field, exists. Statistically, the ratio of pixels of which the frame difference is within "4" grayscales is "60%" or less.

Therefore if pixels exist in an area of which difference value ratio (Sum) is "60%" or less, or the frame difference value is "60" grayscales or later, it can be judged that the current field F(t) is the another field with noise.

In the present embodiment, to judge whether the current field F(t) is the another field with noise with certainty, it is judged whether pixels do not exist in an area where the frame difference value is "80" grayscales or later.

Therefore if the difference value ratio (Sum) of Formula (7) is "60%" or less, or if the count value S31COUNT that satisfies Formula (6) is not "0", it can be judged that the current field F(t) is the another field with noise.

In this way, according to the present embodiment, it is judged whether the current field F(t) has noise or not based on the frame difference ratio (difference value ratio (Sum)) in order to create the flag information table, and it is also judged whether the current field is the repeat field or another field by changing the frame difference value (that is, the first to fifth threshold values) depending on whether noise exists or not.

The presence of noise is judged by the frame difference ratio because the frame difference when noise is absent is confined in a range from "80%" to "90%" statistically (or as a result of experiment), as mentioned above. Each value to indicate the difference value ratio (Sum) is set to "90%" or "70%", so as to judge the presence of noise with certainty.

Each value of the difference value ratio (Sum) is an example, and may be other values. Therefore it can be judged that the current field is the another field without noise when the difference value ratio (Sum) is "98%" or less or the count value S21COUNT is not "0", and that the current field is the repeat field with noise when the difference value ratio (Sum) is "65%" or more, and the count value S22COUNT is not "0", and that the current field is the another field with noise when the difference value ratio (Sum) is "64%" or less or the count value S31COUNT is not "0".

Based on such judgment, the flag information creation processing unit 50 stores each value for each field in each item of the flag information table. In the present embodiment, two flag information tables, one for the case of the no noise state and another for the case of the noise state, are provided. FIG. 3B and FIG. 3C show examples respectively.

The repeat field judgment unit 60 judges whether the current field is the repeat field or not based on the created flag information table. This repeat field judgment unit 60 actually performs judgment on whether the current field is the repeat field without noise or not and performs other judgments mentioned above.

In the present embodiment, information on the current field and past 10 fields, a total of 11 fields, are stored in the flag information table.

This is because the repeat field is repeated once every five fields in the input image by 32-pull down, and whether the current field is the repeat field or not can be detected only when this sequence is detected. If the repeat field is detected only in the past five fields, and then 60 frames of the progressive image is displayed by IP transform, the image is displayed like a "comb", and the image deteriorates. Therefore, in order to prevent a detection error of the 32-pull down sequence and to prevent image deterioration, a margin is provided to the sequence, and information on the past 10 fields is stored.

FIG. 5 is an example of the flag information table when noise does not exist. In the items [Field] [0] and [Field] [1] at the left side in FIG. 5, the current field (top level in FIG. 5) is "1" and "0" respectively, and the past four fields are continuously "0" and "1" respectively. Also the fifth field in the past is "1" and "0" respectively.

Therefore the repeat field judgment unit 60 judges that the current field is the repeat field by checking that the 32-pull down sequence, in which "0" or "1" is repeated in the past four fields and the fifth field in the past is "1" or "0", is repeated twice in the information table.

FIG. 6 is an example of the flag information table when noise exists. In this case as well, judgment can be made in the same manner in items [Field] [2] and [field] [3] at the right side.

Based on the judgment result of the repeat field judgment unit 60, the 32-transform control unit 70 outputs 60 fields of the progressive image. Actual IP transform is performed by the 32-transform control unit 70.

By judging the repeat field, the 32-transform control unit 70 regards the field as a pair of repeat field, not as a field in the back but as a field in the front on the time base, and combines this repeat field and the front field, and outputs them as one frame. By this combination, an output image, of which image quality is equivalent to the input image, without image deterioration, can be acquired. And 60 fields of the progressive image with no repeat filed can be output. Clearly other combinations are possible if the output image is not deteriorated.

FIG. 7 to FIG. 10 are flow charts depicting examples of the operation of the processing executed by this detection device 1.

FIG. 7 is a flow chart depicting an example of whole processing. When the processing is started (S10), the detection device 1 executes the statistical information extraction processing (S20).

The statistical information extraction processing is a processing for computing the frame difference value (difference absolute value (diff)) in the pixel difference absolute value subtractor 20 (computing Formula (1)), comparing the result with each threshold value in the absolute value difference comparator 30 (computing Formula (2) to Formula (6)), and acquiring one field of the count value (e.g. S11COUNT) in the cumulative adder 40.

Figure 8:
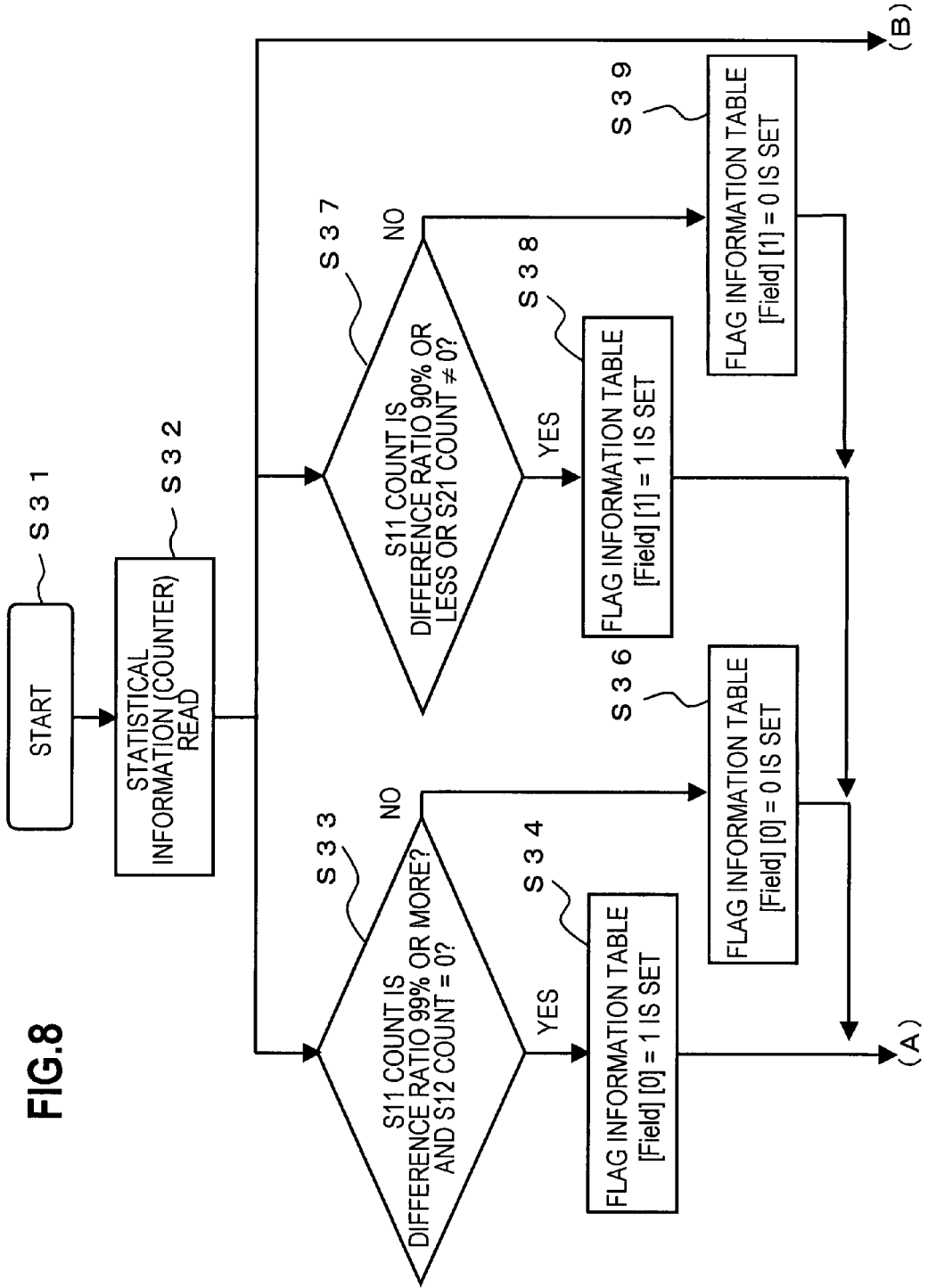
FIG. 8 is a flow chart depicting an example of the operation of flag information table creation processing.

Then in the flag information creation processing 50, the flag information table creation processing is executed (S30). FIG. 8 shows a example of details of the flag information creation processing.

When this creation processing is started (S31), the statistical information (count value) is read first (S32). The flag information creation processing unit 50 reads each counter value (e.g. S11COUNT) accumulated by the cumulative adder 40.

And Formula (7) is computed from the count value S11COUNT, and the frame difference ratio (Sum) is determined, and it is judged whether the frame difference ratio (Sum) is "99%" or more and the count value S12COUNT is "0" or not (S33). If this condition is satisfied (YES), "1" is stored in the item [Field] [0] of the flag information table (S34). If not (NO in S33), "0" is stored in the item [Field] [0] (S36). Then this creation processing (S35 in FIG. 9) ends.

On the other hand, it is also judged whether the frame difference ratio (Sum) is "90%" or less or the count value S21COUNT is not "0" (S37). If this condition is satisfied (YES), "1" is set in the item [Field] [1] of the flag information table (S38), and if not (NO in S37), "0" is set (S39). And this creation processing ends (S35).

Figure 9:
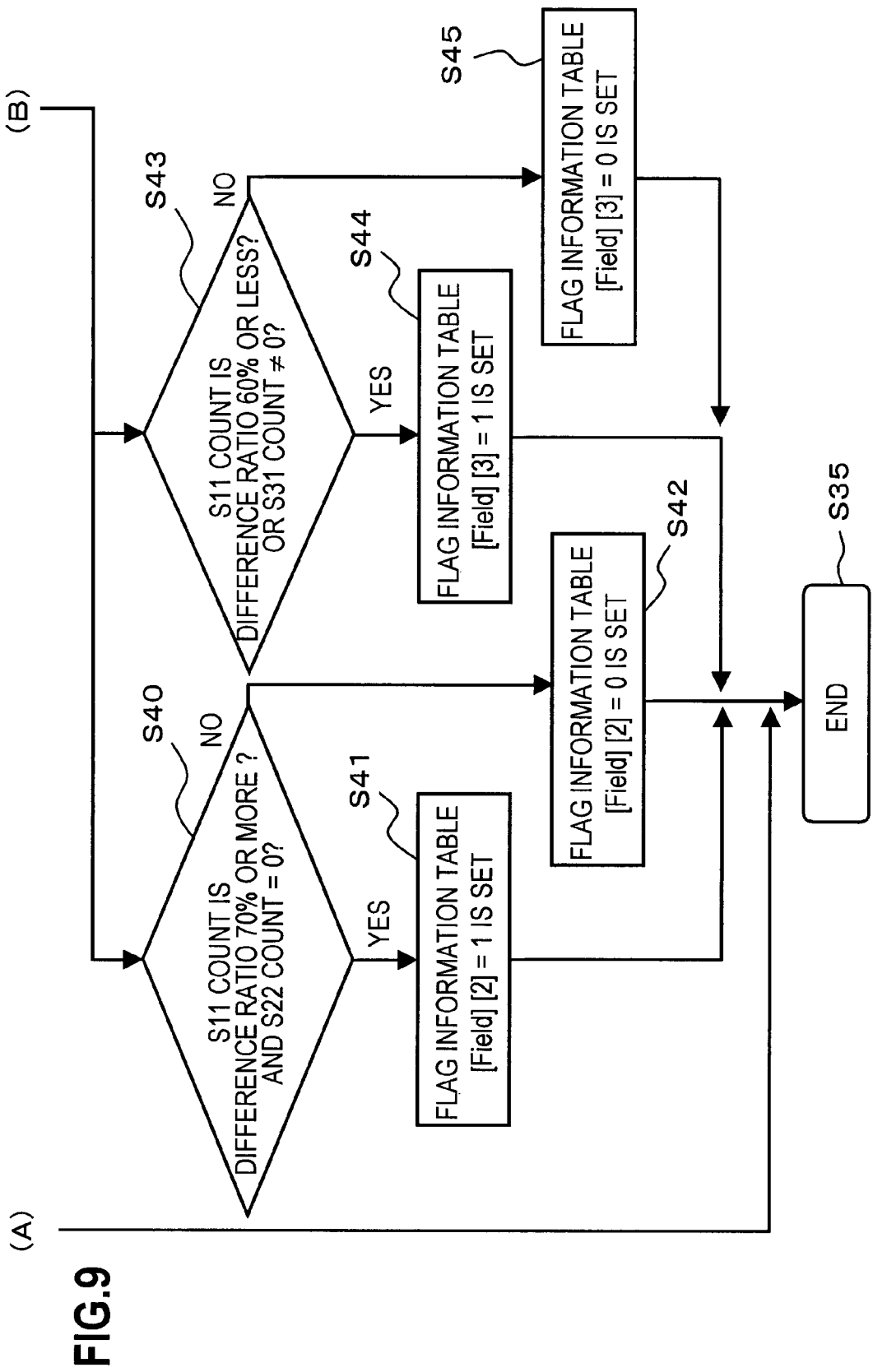
FIG. 9 is a flow chart depicting an example of the operation of flag information table creation processing.

It is also judged whether the frame difference ratio (Sum) is "70%" or more, and the count value S22COUNT is "0" (S40 in FIG. 9). If this condition is satisfied (YES), "1" is set in the item [Field] [2] of the flag information table (S41), and if not (NO in S40), "0" is set (S42). And this creation processing ends (S35).

Also it is judged whether the frame difference ratio (Sum) is "60%" or less or the count value S31COUNT is not "0" (S43). If this condition is satisfied (YES), "1" is set in the item [Field] [3] of the flag information table (S44), and if not (NO in S43), "0" is set (S45). And this creation processing ends (S35).

Back in FIG. 7, the repeat field detection processing is then executed (S50) in the repeat field judgment unit 60.

FIG. 10 shows the example of the details of the repeat field detection processing.

When this detection processing starts (S51), the flag information table is read (S52). And it is detected whether the current field has noise or not from the flag information table (S53).

It is judged that the current field is the field without noise if the flag "1" is stored in the item [Field] [0] or the item [Field] [1] of the flag information table, and it is judged that the current field is the field with noise if the flag "1" is stored in the item [Field] [2] or item [Field] [3].

When noise exists (YES), information on the past N fields is referred to in the information table for the no noise state (S55). This is for detecting the 32-pull down sequence.

And it is judged whether the flag to indicate the repeat field exists once every five fields, and there are four flags to indicate another field continuously there between (S55). If this condition is satisfied (YES), it is judged that the current field is the repeat field without noise (S56). And this detection processing ends (S57).

If this condition is not satisfied (NO in S55), it is judged that the current field is the another field without noise (S58). And this detection processing ends (S57).

When the current field has noise (NO in S53), past N fields are referred to in the flag information table for the noise state (S59). And it is judged whether the flag to indicate the repeat field exists once every five fields, and there are four flags to indicate another field continuously there between (S60).

If this condition is satisfied (YES), it is judged that the current field is the repeat field with noise (S61). If not (NO in S60), it is judged that the current field is the another field with noise (S62). And this detection processing ends (S57).

In this detection processing, there are two information tables, one for the case of the noise state and another for the case of the no noise state, so the presence of noise is judged in S53, then the same processing is executed respectively.

Back in FIG. 7, the 32-transform control unit 70 then executes the transform control (S70). For the detected repeat field, processing to create an IP-transformed frame is performed by combining the previous field on the time base to the detected repeat field, for example.

And the entire processing ends (S80).

In this way, the flag information table is created from the difference value ratio (Sum) and the count value (e.g. S12COUNT), the past N fields are referred to in this table, and the 32-pull down sequence is detected first, then it is detected whether the current field is the repeat field or not, so repeat fields can be detected at high precision.

Also 60 frames of the progressive image is generated by 32-transform control based on the detected repeat fields, so the output image equivalent to the input image without image deterioration can be acquired.

FIG. 11 is a diagram depicting a configuration example of another detection device 1. The difference from the detection device 1 in FIG. 1 is that the motion compensation control unit 80 is installed, instead of the 32-transform control unit 70.

With the above example, if the input image is a still image, "1" or "0", the same as the repeat field without noise, is stored in the item [Field] [0] and [Field] [1] of the flag information table continuously for several fields.

In the present embodiment, if "1" or "0" is stored continuously for "5" fields, the repeat field judgment unit 60 judges that the continuous fields are fields of the still image. For certain it may be judged as the fields of the still image when a number of fields, other than "5" are stored.

If 32-transform control is performed for the field judged as the still image like this, normally the sixth field is damaged, and the output image quality deteriorates.

Therefore, as shown in FIG. 11, if a field is judged as that of the still image, 32-transform control is not performed, and motion compensation control is performed on this field so as to prevent image deterioration.

In the motion compensation, a motion vector is detected in the image, and the estimated error is corrected based on this information to acquire the correct image. Such motion compensation can be implemented by a known configuration and operation.

In the example in FIG. 11 as well, an effect the same as the above mentioned example is exhibited.

In the above mentioned example, the specific value of the first threshold value (S11_TH) was described as "5". Needless to say, this is an example, and any threshold value, if the value satisfies the frame difference distribution shown in FIG. 4A and FIG. 4B, can be used as well as the above example, and can exhibit the same effect.

Also in the above example, the grayscale value of the input image was described as "8" bits ("256" grayscales). The present invention can be applied to the input image having another number of bits (grayscales), and the same effect can be exhibited.

The present detection device 1 can be suitably applied to such information equipment as a personal computer, such a display device as a liquid crystal TV, and other equipment that can display progressive type images.

What is claimed is:

1. A detection device, comprising:
   a difference distribution information generation unit which calculates a difference absolute value in pixels between frames for an input interlace image, compares the difference absolute value with a plurality of thresholds, adds the comparison result for one field, and generates a plurality of counts;
   an information table creation unit which detects whether or not the interlace image of a current field includes noise and if the current field is a repeat field, based on the plurality of counts, and stores a flag indicating whether or not the current field is the repeat field for m (m is 5 or higher integer) fields in a first information table when the current field including the noise is detected, or in a second information table when the current field not including the noise is detected, respectively; and
   a repeat field judgment unit which refers to the first or second information tables based on whether or not the current field includes noise, judges that the current field is the repeat field when the flag indicating the repeat field in the current field and a field which is 5 fields before is stored and the flag indicating not the repeat field between the current field and the field which is 5 fields before is stored, in the first or second information table, and judges that the current field is not the repeat field when not.

2. The detection device according to claim 1, wherein the information table creation unit judges whether each of the field has noise or not, based only on the generated plurality of counts.

3. The detection device according to claim 1, wherein the repeat field judgment unit judges that the current field is a still image when information to indicate the repeat field is continuously stored in the first or second information tables.

4. The detection device according to claim 3, further comprising a motion compensation control unit which controls motion compensation for the input interlace image when the current field is judged as the still image by the repeat field judgment unit.

5. The detection device according to claim 1, wherein the information table creation unit creates the first and second information tables by comparing the difference absolute value with five types of threshold values.

6. The detection device according to claim 1, wherein information of the current field and past 10 fields, a total of 11 fields, is stored in the first and second information tables.

7. A detection method comprising:
calculating the difference absolute value in pixels between frames for an input interlace image,
comparing the difference absolute value with a plurality of thresholds,
adding the comparison result for one field, and
generating a plurality of counts;
detecting whether or not the interlace image of a current field includes noise and if the current field is a repeat field, based on the plurality of counts, and stores a flag indicating whether or not the current field is the repeat field for m (m is 5 or higher integer) fields in a first information table when the current field including the noise is detected, or in a second information table when the current field not including the noise is detected, respectively; and
referring to the first or second information tables based on whether or not the current field includes the noise,
judging that the current field is the repeat field when the flag indicating the repeat field in the current field and a field which is 5 fields before is stored and the flag indicating not the repeat field between the current field and the field which is 5 fields before is stored, in the first or second information tables, and
judging that the current field is not the repeat field when not.

* * * * *